United States Patent [19]
Cho

[11] Patent Number: 5,916,490
[45] Date of Patent: Jun. 29, 1999

[54] HUMIDIFIER AND MEANS FOR REMOVING CALCIUM CARBONATE FROM WATER

[75] Inventor: Young I. Cho, Cherry Hill, N.J.

[73] Assignee: Electronic Descaling 2000, Inc., Boothwyn, Pa.

[21] Appl. No.: 08/897,070

[22] Filed: Jul. 21, 1997

[51] Int. Cl.[6] .................................................. B01F 3/04
[52] U.S. Cl. .................. 261/72.1; 261/81; 261/DIG. 46; 261/DIG. 48; 210/748
[58] Field of Search ................................. 261/72.1, 78.2, 261/81, DIG. 46, DIG. 48; 204/660, 661, 663, 672, 673, 229; 205/316, 742, 760; 210/243, 748

[56] References Cited

U.S. PATENT DOCUMENTS

| | | |
|---|---|---|
| 943,188 | 12/1909 | Hartman . |
| 2,299,964 | 10/1942 | Crouch .................................... 204/149 |
| 2,534,234 | 12/1950 | Cox ........................................... 204/56 |
| 3,236,757 | 2/1966 | Litt ........................................ 204/149 |
| 3,476,673 | 11/1969 | Stiles ..................................... 204/196 |
| 3,637,482 | 1/1972 | Vajda ..................................... 204/228 |
| 3,652,433 | 3/1972 | Thompson ............................. 204/152 |
| 3,718,552 | 2/1973 | Mortell .................................. 204/105 |
| 3,776,530 | 12/1973 | Griffith et al. ............................. 261/4 |
| 3,899,410 | 8/1975 | Aber et al. .............................. 204/302 |
| 4,119,508 | 10/1978 | Yokota et al. ......................... 204/128 |
| 4,172,780 | 10/1979 | Kammel et al. ....................... 204/213 |
| 4,257,989 | 3/1981 | Nishikawa ................................ 261/4 |
| 4,419,206 | 12/1983 | Frame ..................................... 204/228 |
| 4,636,288 | 1/1987 | Vaughan .............................. 204/182.4 |
| 4,663,091 | 5/1987 | Seo .................................. 261/DIG. 48 |
| 4,734,176 | 3/1988 | Zemba, Jr. et al. .................... 204/149 |
| 4,781,805 | 11/1988 | Dahlgren ................................ 204/149 |
| 4,789,444 | 12/1988 | Watanabe et al. . |
| 4,908,109 | 3/1990 | Wright .................................... 204/149 |
| 4,917,782 | 4/1990 | Davies .................................... 204/152 |
| 5,062,940 | 11/1991 | Davies .................................... 204/228 |
| 5,094,739 | 3/1992 | Kump ...................................... 204/150 |
| 5,124,017 | 6/1992 | Rogov et al. ........................... 204/263 |
| 5,164,091 | 11/1992 | Huber et al. ........................... 210/638 |
| 5,234,563 | 8/1993 | Arai et al. .............................. 204/229 |
| 5,304,289 | 4/1994 | Hayakawa ............................. 204/149 |
| 5,328,574 | 7/1994 | Mercier .................................. 204/149 |
| 5,354,515 | 10/1994 | Ushimaru .............................. 261/72.1 |
| 5,435,894 | 7/1995 | Hayakawa ............................. 204/149 |
| 5,460,718 | 10/1995 | Weck et al. ............................ 210/205 |
| 5,529,684 | 6/1996 | Greaney et al. ....................... 205/688 |
| 5,584,981 | 12/1996 | Turner et al. .......................... 204/536 |
| 5,603,843 | 2/1997 | Snee ....................................... 210/748 |

FOREIGN PATENT DOCUMENTS

| | | | |
|---|---|---|---|
| 3-251625 | 11/1991 | Japan ............................. 261/DIG. 46 |
| 6-129677 | 5/1994 | Japan ............................. 261/DIG. 46 |

*Primary Examiner*—C. Scott Bushey
*Attorney, Agent, or Firm*—Robert S. Lipton, Esq.; Lipton, Weinberger & Husick

[57] ABSTRACT

A humidifier is provided of the type which has a water tank or reservoir for holding tap water. Common tap water frequently is "hard" due to dissolved minerals which result in the humidifier emitting a fine dust when such water is used. By affixing electroplated electrodes to the interior of the tank minerals such as calcium carbonate can precipitate on the surface of the cathodes. Temporarily reversing the polarity of the electrodes will cause the calcium carbonate to be dislodged from the electrodes and fall to the bottom of the reservoir where it can be removed.

24 Claims, 9 Drawing Sheets

HUMIDIFIER AND MEANS FOR REMOVING CALCIUM CARBONATE FROM WATER

BACKGROUND OF THE INVENTION

1. Field of the Invention

This invention relates to humidifiers in general and to residential humidifiers in particular. As is well known, such humidifiers are used to increase the humidity in the room in which they are located as well as adjacent rooms. It is well known that increasing the humidity level in a dry room makes it more comfortable for the room's occupants. Present day ultrasonic room humidifiers, which are in widespread use today, have a significant disadvantage in that their use results in a coating of white dust on surfaces in the room.

2. Description of the Prior Art

Early humidifiers were primarily used by ill persons suffering with chest congestion. Humidifiers of this type were called vaporizers and created water vapor through the application of heat. Warm, moist air or vapor channeled directly to the patient.

Residential humidifiers are used to increase the humidity level in one or more rooms having very dry air. This is frequently found in homes with forced hot air heating systems. The room humidity generally decreases as the outside air temperature decreases. As the humidity level drops the discomfort level increases. Of course, very dry air is also found in homes in hot desert geographical areas. One solution to this problem has been the introduction of so-called cold air room humidifiers. These humidifiers are more desirable for general room use than vaporizers with heating elements, as the high localized humidity levels which they create for patients is not required for increasing the humidity levels in a room under normal circumstances. These humidifiers also have larger water reservoirs and use less water per hour, thus increasing the time between reservoir refills. Some cold air humidifiers accomplish their purpose by rotating a porous wheel or drum made of a sponge-like material through water. A fan blows air through the porous material thus causing the water to evaporate, increasing the humidity in the room.

One of the problems with the cold air humidifiers of this type is their relatively large size. Another problem has been the buildup of "scale" on the porous drum. This buildup of scale can be minimized through the use of additives; however, their use is both costly and inconvenient. Ultimately, the porous drums must be replaced. The large size problem of residential room humidifiers of this type was solved with the advent of vaporization humidifiers.

In vaporization humidifiers the small water droplets caused by the atomization of the water, evaporate subsequent to their ejection into a room. However, dissolved substances, e.g., minerals and the like, contained in the water precipitate out of solution when the water evaporates. Since the atomized water droplets are very small, the amount of solid substances which remain after evaporation is quite small. These particles are the white dust found on surfaces in rooms where vaporization humidifiers are used.

It is these minerals which also form the scale in the rotating porous member of the rotating drum humidifiers. In the hot air vaporizer, the concentration of minerals increases in the water which remains and, if the water is completely used, may be found as deposits on the bottom of the water container. Similar deposits are found in the bottom of a pan when water is permitted to boil off or evaporate.

Distilled water may be used to eliminate the dust problem associated with vaporization humidifiers. Since distilled water has no minerals in it, no dust can form as a result of its use. However, its cost and the inconvenience of using it on a regular basis make its use undesirable.

Ultrasonic humidifiers are the primary type of atomization residential humidifiers currently in use and are much smaller than the drum type humidifier. Ultrasonic humidifiers operate by permitting water from a removable reservoir to pass to a chamber containing an ultrasonic transducer. A vibrating surface of the ultrasonic transducer causes the water to be atomized. A fan ejects the air containing the atomized water into the room. However, ultrasonic humidifiers still have a problem. In ultrasonic humidifiers the dissolved minerals cause deposits or scale to build up on the ultrasonic transducer. This decreases its effectiveness. In some cases where the dissolved mineral concentrations are high, as in areas having very hard water, the transducer can become ineffective in as little as one week of high usage.

A solution to the "white dust" problem is proposed in U.S. Pat. No. 5,354,515 issued Oct. 11, 1994, to Ushimaru. Ushimaru appears to attribute the white dust to sodium chloride. The solution taught by Ushimaru uses permeable membranes to separate the water reservoir of humidifiers into 5 chambers. The end chambers contain electrodes.

When a voltage is applied to electrodes of Ushimaru, the dissolved sodium chloride ions are driven into the two end chambers containing the electrodes and into the middle chamber using membranes specifically chosen for the sodium and chloride ions. The water in the remaining two chambers is purified, i.e., the salt is removed therefrom or at least substantially reduced, and the water is channeled to the ultrasonic transducer for use in humidifying the room. The water, having the concentrated levels of salt, is channeled to a separate storage container from which it is ultimately removed and disposed of. In summary, Ushimaru removes the dissolved minerals from the water before it reaches the transducer in such a manner that scale is not deposited on the electrodes. The invention taught by Ushimaru patent attempts to keep mineral ions suspended in water and away from electrodes, requiring the use of membranes, and a specific membrane based on the presence of each different mineral ion.

It is an obvious disadvantage of Ushimaru that only a portion of the water contained in the reservoir is used for humidifying purposes while the remaining water is thrown away. Furthermore, the membrane chosen for a particular metal ion (e.g. $Na^+$) may not be useful for other metal ions such as $CA^{++}$, $Mg^{++}$, etc. Hence, it may not be feasible to remove all types of metal ions with one or two membranes. Ushimaru asserts that an advantage of the invention described therein is that since no substances are deposited on the electrodes they do not require replacement for that reason.

SUMMARY OF THE INVENTION

The "white dust" generated by humidifiers, which is found undesirable by many users, consists of very fine particles of the various minerals which are dissolved in the water used by the humidifier. Water containing high levels of such minerals is generally referred to as "hard" water, while water having a very low concentration of such minerals, or none at all, is known as "soft" water. As one might expect, the particular minerals in water vary depending upon the water's source. However, it has been found that the "white dust" and scale which is deposited on the ultrasonic transducer is primarily calcium carbonate.

The present invention utilizes electroplating technology to cause the calcium ions in hard water to precipitate out of solution and coat a negative electrode, or cathode. The bicarbonate ions, which result from the dissolution of calcium carbonate in water, become oxidized at the positive electrode, or anode, and is released as carbon dioxide gas. In a conventional electroplating application, a metal such as silver would be deposited on a bowl or the like which serves as the cathode.

The present invention solves the problem of calcium carbonate (or any metal salt) particulate white dust being deposited from mist produced by ultrasonic humidifiers' use of hard water as well as the problem of scale build-up on the transducer. This is accomplished by incorporation of an electroplating cathode and anode in the removable water storage tank or reservoir of the humidifier, although they may be operatively placed anywhere upstream from the transducer. When appropriate electrical power is applied to the electrode the dissolved calcium carbonate is electroplated or deposited on the negative electrode or cathode. The electrodes, in one embodiment of the invention, are placed on opposite ends of the reservoir. As will become subsequently apparent, other configurations of the electrode within the reservoir are possible. The invention can be embodied as a stand-alone apparatus that can be used with any humidifier.

The buildup of calcium carbonate on the electrodes can be removed by reversing the polarity of the electrodes for a period of time. The calcium carbonate, instead of being re-dissolved into the water, becomes dislodged from the electrode and falls to the bottom of the reservoir in an array of calcium carbonate particles where they can be removed.

In order for the device to function in an efficient and cost-effective manner, it is important that the electrodes be of an appropriate material and have an appropriate shape.

As will be apparent to those skilled in the art, although the present invention is shown applied to humidifiers having ultrasonic transducers, it may be applied to any type of humidifier wherein dissolved minerals create a problem. The problem can be internal to the humidifier in the form of calcium carbonate scale or external to the humidifier in the form of white dust.

Accordingly, it is an object of the present invention to provide a humidifier having the means to remove dissolved calcium carbonate and other minerals from water prior to the water's atomization by the humidifier's vaporization means.

It is a further object of the present invention to provide such a humidifier and means for removing dissolved calcium carbonate and other minerals wherein substantially all of the water in the humidifier reservoir is used by the humidifier for humidifying purposes.

It is a further object of the present invention to provide an ultrasonic humidifier and means for removing calcium carbonate and other minerals by using an electroplating technique to cause the calcium or other metal ions to precipitate out of solution and on the surface of a cathode.

It is a further object of the present invention to provide an ultrasonic humidifier having electrodes for removing dissolved minerals with means for removing calcium carbonate scale from the electrodes.

It is still another object of the present invention to provide an ultrasonic humidifier having means for removing mineral ions from water, which does not use membranes and operates independent of the particular mineral ions contained in the water.

These and other features and objects of the present invention will be apparent from following the description of the preferred embodiments and the description of the drawings.

DETAILED DESCRIPTION OF THE EMBODIMENT

Figure 1:
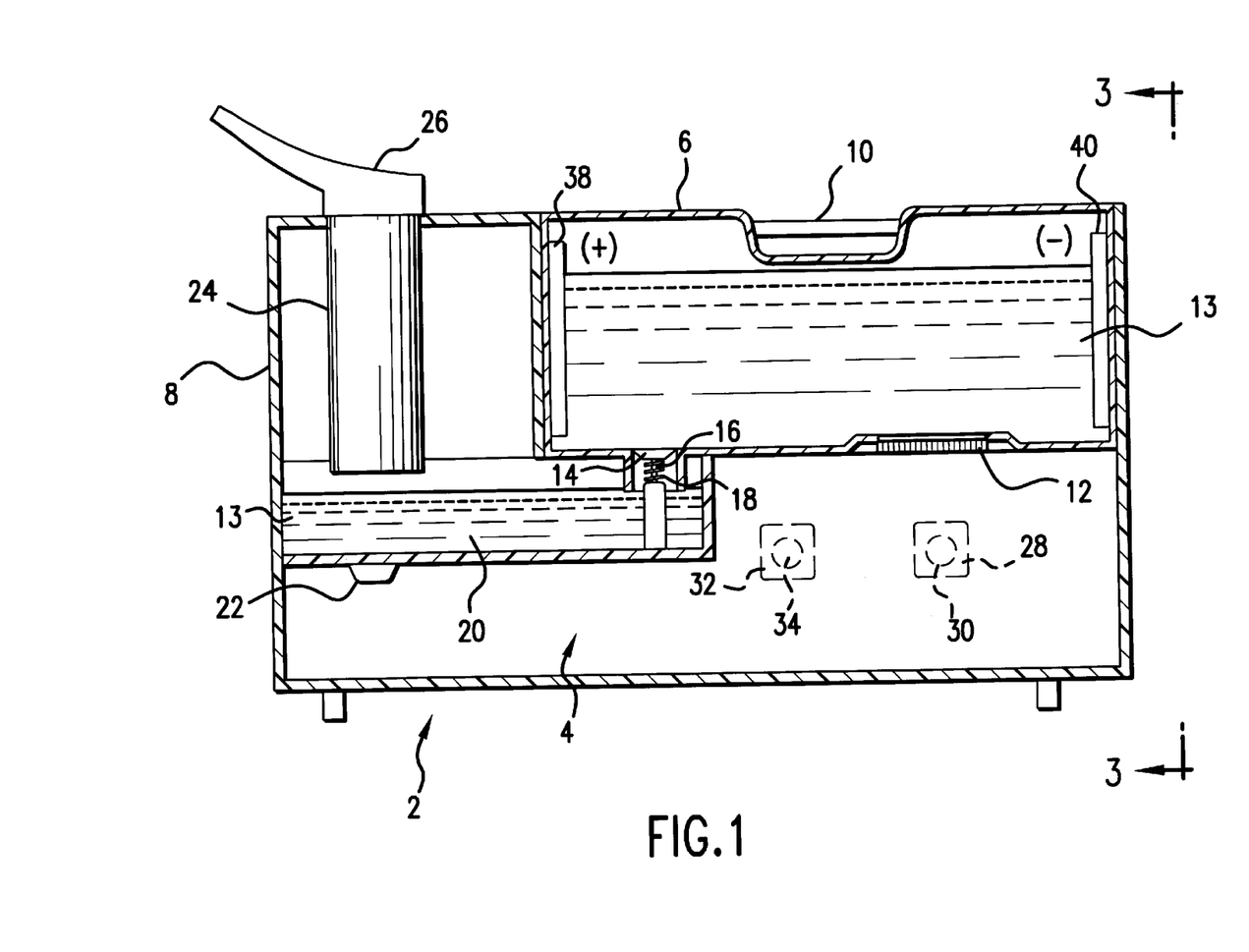
FIG. 1 is a sectional view showing a typical ultrasonic residential humidifier.
Figure 2:
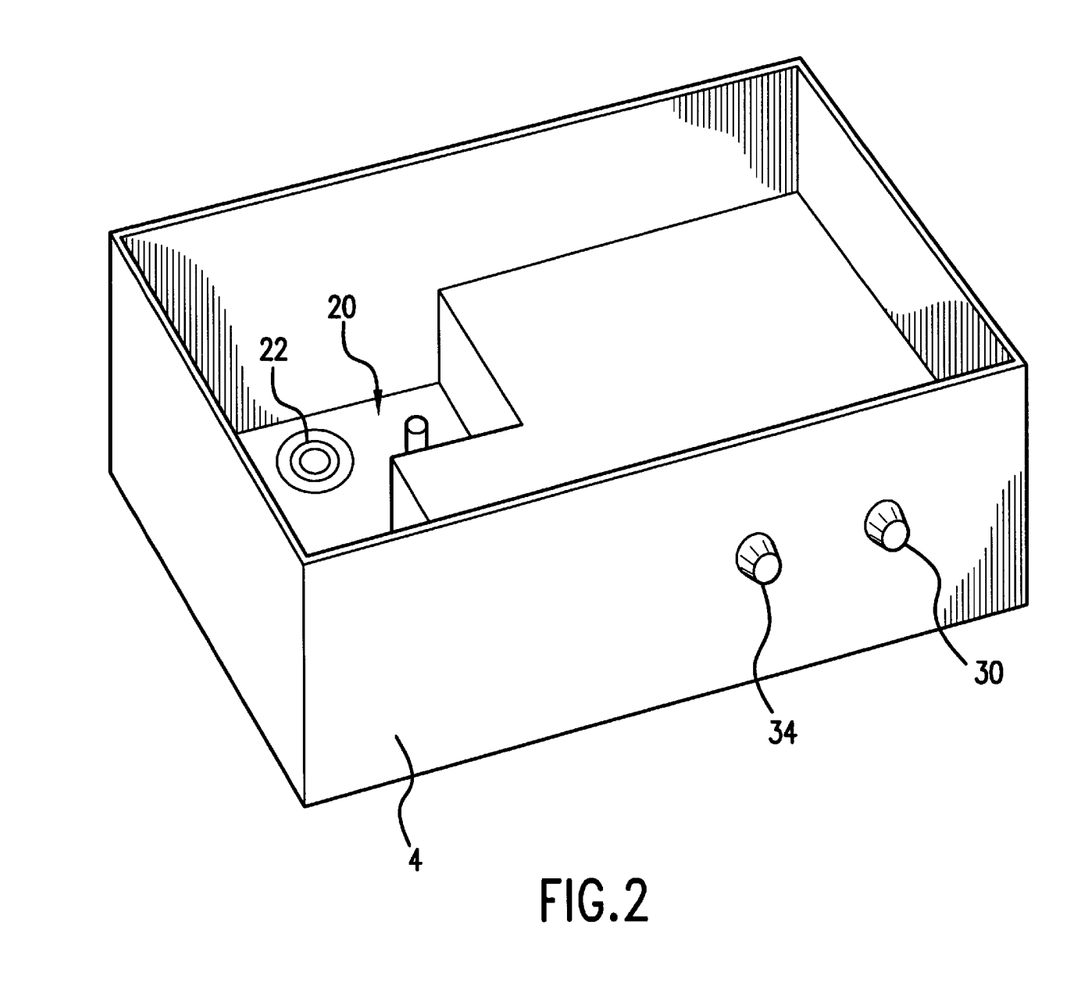
FIG. 2 is a perspective view showing the base of the humidifier shown in FIG. 1.
Figure 3:
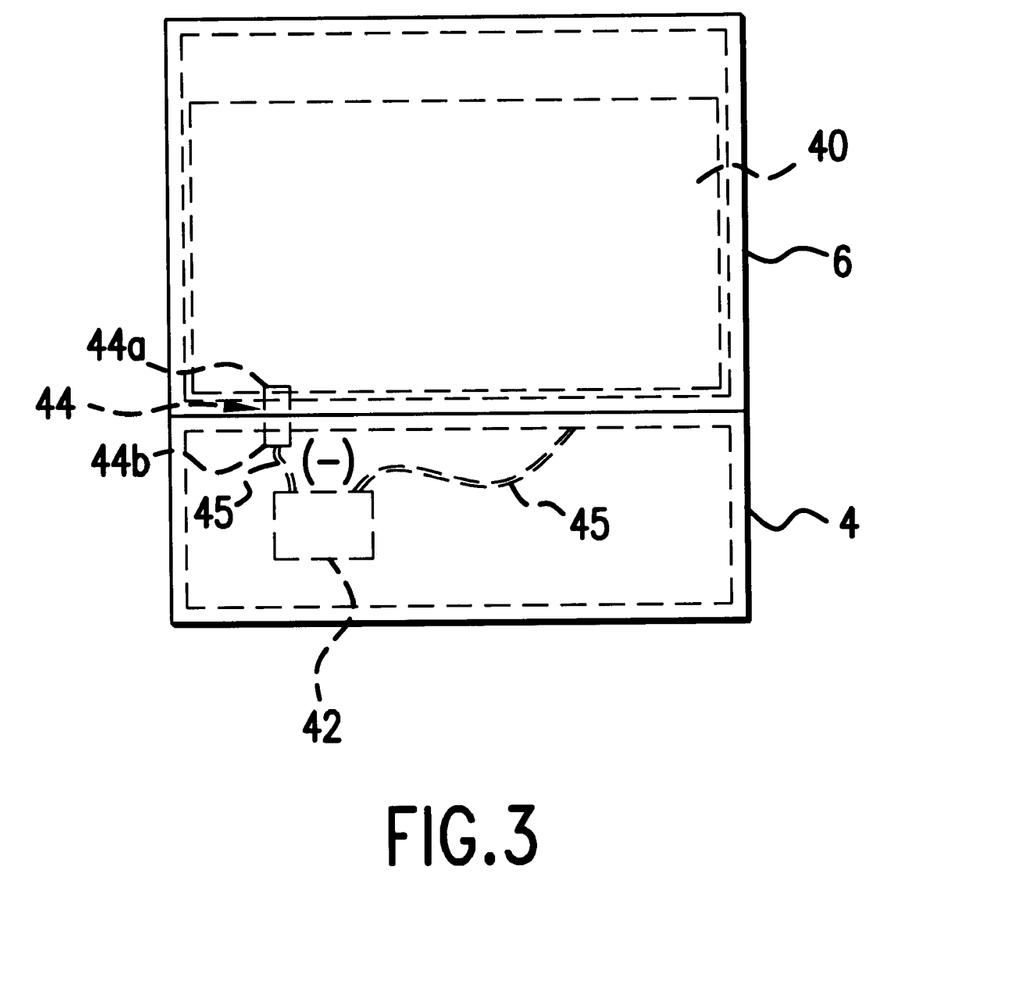
FIG. 3 is a sectional view taken along line 3—3 in FIG. 1.

An embodiment of the invention is shown in FIGS. 1–3. The invention as depicted is a modification to conventionally available well known room humidifiers. Many of the features which such humidifiers generally have in common are shown in the figures.

A humidifier 2 is shown having a base 4, reservoir 6 and a housing 8. The removable reservoir 6 includes a handle 10 and a cap 12. The cap 12 may be removed for filling the reservoir 6 with water 13. The reservoir 6 also includes a valve 14 for permitting water to be released from the reservoir 6. When the reservoir 6 is properly positioned on the base 4, a post 16 secured to the base 4 pushes against the valve 14 opening it. Similarly, when the reservoir 6 is removed from the base 4 a spring 18 forces the valve 14 closed.

Upon proper placement of the reservoir 6 on the base 4, water 13 is permitted to flow into the atomization chamber 20 in base 4. The water 13 is vaporized by any suitable means but is atomized by an ultrasonic transducer 22 in the embodiments shown herein. The atomized water is forced through a tube 24 by a fan or blower (not shown) which is formed as an integral part of housing 8 and passes from the humidifier 2 through a nozzle 26. For purposes of this disclosure, atomization is to be considered a means for effecting vaporization.

Attached to the housing 8 is a combination on-and-off switch and variable rheostat 28. The variable rheostat 28 has a knob 30 which can be used to adjust the current flowing through the ultrasonic transducer 22 thus controlling the degree to which the water 13 is atomized. Also attached to the base 4 is a humidistat 32. The humidistat 32 permits the transducer 22 to be deactivated by cutting off the current supply to it, when a user-selected level of humidity has been reached. The user may vary the humidity level by rotating a knob 34 on the humidistat 32.

As is well known to those skilled in the ultrasonic humidifier art, in operation water flows from the reservoir 6 through the valve 14 into the atomization chamber 20 in the base 4 of the humidifier 2. The water 13 is then atomized by the ultrasonic transducer and ejected through the tube 24 in the housing 8 through the nozzle 26. Each very small droplet of water ejected from the humidifier contains dissolved minerals including calcium carbonate. After the tiny water droplets leave the humidifier and float through the air in the room, the water in the droplet evaporates leaving a very tiny particle of calcium carbonate and/or any other mineral which may have been dissolved in the droplet. These very light and very small particles form the undesirable and objectionable dust on surfaces in the room in which the humidifier 2 is located.

Calcium carbonate is removed from the water 13 in the reservoir 6 by using an electroplating technique. This is accomplished by placing electrodes 36, an anode 38 and a cathode 40, in the reservoir 6. It is important that the electrodes 36 themselves do not participate actively in the electroplating process. Active participation may result in material from the electrodes 36 being introduced into the water 13, thus contributing to the problem of particulate being ejected from the humidifier 2. Active participation in the electroplating process by the electrodes 36 may also cause them to be pitted or otherwise damaged, thus reducing their effectiveness in removing calcium carbonate from the water 13 in the reservoir 6. It has also been discovered that the shape of the electrodes 36 is a very material factor in the efficiency of the electroplating process.

As can be seen in FIGS. 1–3, electrodes 36 are shown in the form of flat sheets affixed to opposite sides of the reservoir 6. The sheets are made of electrode-grade graphite although other materials may be used. The calcium carbonate in the water 13 in the reservoir 6, when dissolved, forms calcium cations and bicarbonate anions. When a direct current is applied to the electrodes 36, the cations are reduced at the cathode 40, thus electroplating the cathode 40 with calcium carbonate. The anions are oxidized at the anode 38 and carbon dioxide which forms rises to the surface of the water 13 in the reservoir 6. The degree to which calcium carbonate is removed from the water 13 in the reservoir 6 is a function of the amount of calcium carbonate dissolved in the water 13, the strength of the current applied to the electrodes 36, the material the electrodes are made of, and the distance between the electrodes 36 and their surface area, as well as the conductivity of the solution in the reservoir 6.

As can be seen in FIG. 3, a direct current power source 42 is connected to the base 4. Power source 42 consists of a rectifier and resistor. A connector 44 is provided for each of the electrodes 36. The connectors have two parts. One part 44a is connected to the electrode 36 and reservoir 6 and the second part 44b is connected to the base 4. The two parts slidably engage when the reservoir 6 is positioned on the base 4. The negative side of the DC power source 42 is connected by a wire 45 to the connector base portion 44b which is connected to the electrode 36 which is connected to the cathode 40. Similarly, the positive side of the DC power source 42 is electrically connected to the anode 38 by a wire 45. In operation, the reservoir 6 is filled with tap water 13 and placed on the base 4. The post 16 will open valve 14 permitting water flow into chamber 20. If atomization chamber 20 is employed, it will be filled with untreated water. In most cases, the chamber 20 will be filled with previously treated water. However, by minimizing the size of chamber 20, very little untreated water will be used reducing the volume of particulate to unobservable levels.

Once the filled reservoir 6 is in place on housing 8 the knob 30 is used to turn on humidifier 2 and to set the intensity or level of ultrasonic transducer 22 which in turn determines the size of the water droplets and intensity of the mist which they produce.

When the humidifier 2 is turned on, the DC power source 42 supplies current to the electrodes 36. The water 13 contains dissolved calcium carbonate $CaCO_3$ which, upon energization of the electrodes 36, causes $Ca^{+2}$ cations to be reduced at the cathode 40. The result is, calcium carbonate is deposited or plated on cathode 40. Simultaneously, bicarbonate ions are oxidized at the anode 38 resulting in the evolving of carbon dioxide $CO_2$ which bubbles to the surface of the water in reservoir 6. This results in water 13 becoming soft as a result of the removal of the calcium carbonate and other minerals from the water 13. The degree of softness will vary depending on the amount of dissolved minerals in the water 13, the amount of current applied to the electrodes 36, and the characteristics of the electrodes 36 themselves. In the embodiment of the invention shown in FIGS. 1–3, the operative characteristics are as follows:

Reservoir volume: 1 gal

Anode surface area: 375 square cm

Cathode surface area: 375 square cm

Distance between electrodes: 1.0 cm or range 0.6–1.5 cm

DC power source output: 12v

Flow rate from reservoir at medium setting: 920 cc/hr or range 918–520 cc/hr

Initial water hardness: 380 ppm as calcium carbonate

Treated water hardness: 50 ppm as calcium carbonate

After a period of time the cathodes' 40 effectiveness may diminish due to the buildup of calcium carbonate on its surface. The calcium carbonate can be removed by periodically reversing the polarity of the electrodes 36, i.e. the cathode 40 will become the anode 38, and the anode 38 will become the cathode 40.

The calcium carbonate, instead of being substantially re-dissolved in the reservoir water as would normally be expected, becomes dislodged from the cathode 40 (now temporarily anode 38) and falls to the bottom of the reservoir 6 where it can be conveniently removed. It is believed that this is due to carbon dioxide being formed at the surface of the electrode.

Figure 4:
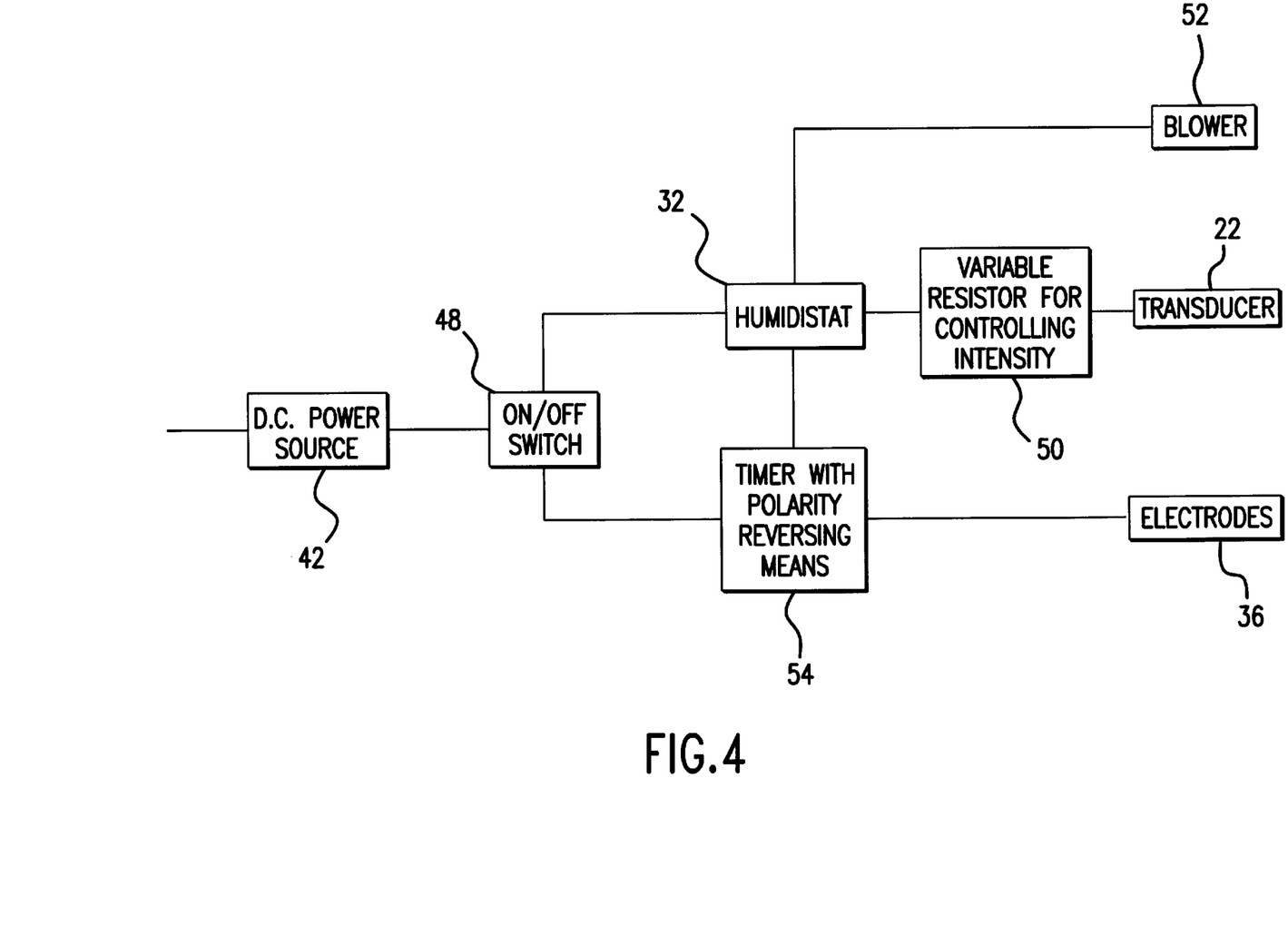
FIG. 4 is a schematic of the electrical system of the invention

Reference is now made to FIG. 4 which shows a block diagram of the electrical circuit for the present invention. The humidifier's DC power source 42 is connected to an external AC power source (not shown) which in turn is connected to an on/off switch 48. The humidistat 32 and variable resistor 50 are connected in series between the on/off switch 48 and the transducer 22. The humidistat 32 provides power to the transducer 22 only when ambient humidity has fallen below a level set by the operator. The variable resistor 50 controls the amount of current to the transducer 22 and thus controls the intensity of the mist it produces. The blower 52 for forcing the mist from the humidifier is also connected to the humidistat 32 so that it operates only when the transducer 22 is receiving current. The on/off switch 48 and variable resistor 50 may be combined as a single unit 28 as previously referred to.

The electrodes 36 are shown connected to humidistat 32 so that they are energized only when the humidifier is turned on. A polarity reversing means with a timer 54 is interposed between on/off switch 48 and electrodes 36. The timer 54 is active only when the humidifier is on. After a normal operating amount of time $T_1$, the timer will reverse polarity to the electrodes 36 for duration of time $T_2$. Although $T_1$ and $T_2$ may be preset by the manufacturer, it is preferred that they be set by the humidifier user due to the wide range times that result due to the degree of water hardness which will be encountered and the design particulars of the humidifier. Under one set of circumstances a $T_1$ of about 10 hours and a $T_2$ of about 1 hour was found satisfactory.

Figure 5:
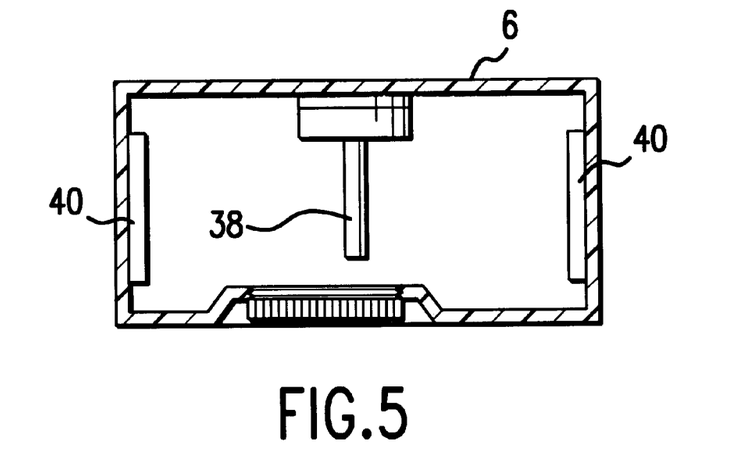
FIG. 5 is a sectional view of another embodiment of the reservoir of the present invention.

A second embodiment of the reservoir 6 of the present invention is shown in FIG. 5. Two cathode electrodes are shown affixed to opposite sides of the reservoir 6. The anode 38 is a circular rod which is connected to and depends from the top of the reservoir 6 at a position equidistant between the two cathodes. The advantage of this embodiment is that the surface area of the cathodes is substantially increased, thus providing a greater surface for the calcium cations to be reduced, thereby increasing the efficiency of their removal. The smaller anode does not substantially reduce its efficiency due to the fact that the oxidation of the bicarbonate anion resulting in carbon dioxide does not require as much surface area as the reduction of the calcium cations.

Figure 6:
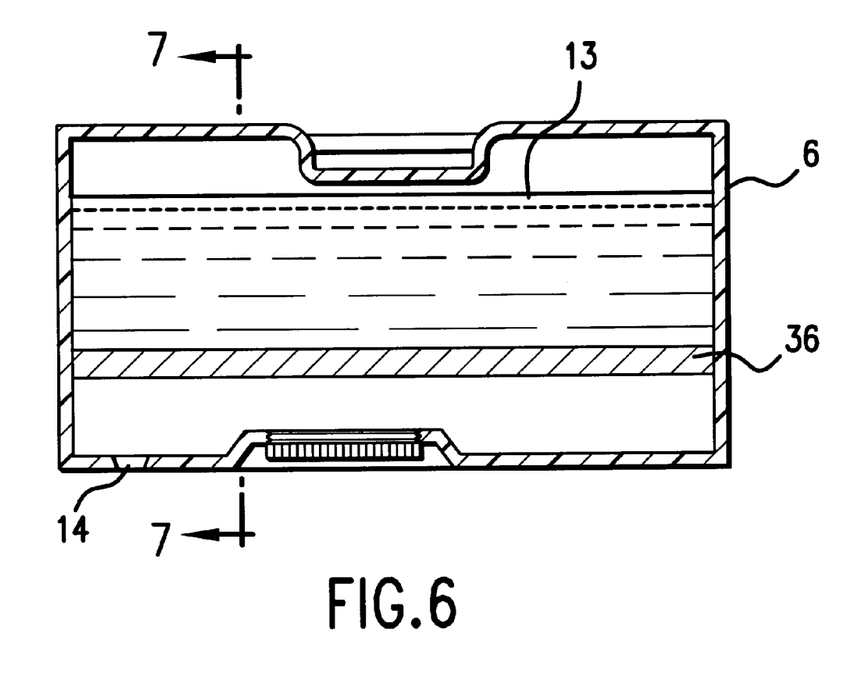
FIG. 6 is a sectional view of another embodiment of the reservoir of the present invention.
Figure 7:
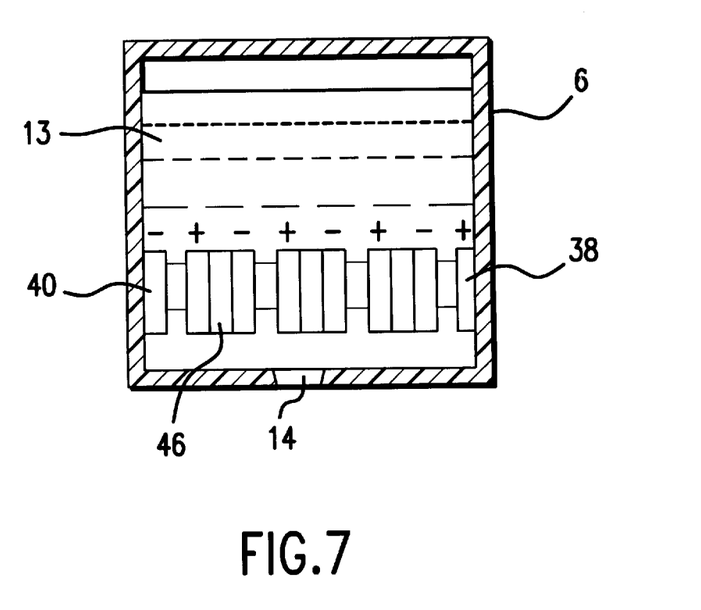
FIG. 7 is a sectional view taken along line 7—7 in FIG. 6.

A third embodiment of the invention is shown in FIGS. 6 and 7. An array of cathodes 40 and anodes 38 are separated by insulators 46 and connected to opposing ends of reservoir 6. The electrodes 36 are in the form of strips of electrode grade graphite and are oriented so that their operative surfaces are vertical. This configuration has the advantage of positioning the electrodes 36 near outlet valve 14 so that the water 13 passing from the reservoir 6 to the chamber 20 has a reduced concentration of dissolved minerals compared with the water in the upper regions of the reservoir 6. As with the other embodiments of the invention, reversal of the polarity of the electrodes 36 will dislodge the coated calcium carbonate permitting its removal.

Figure 8:
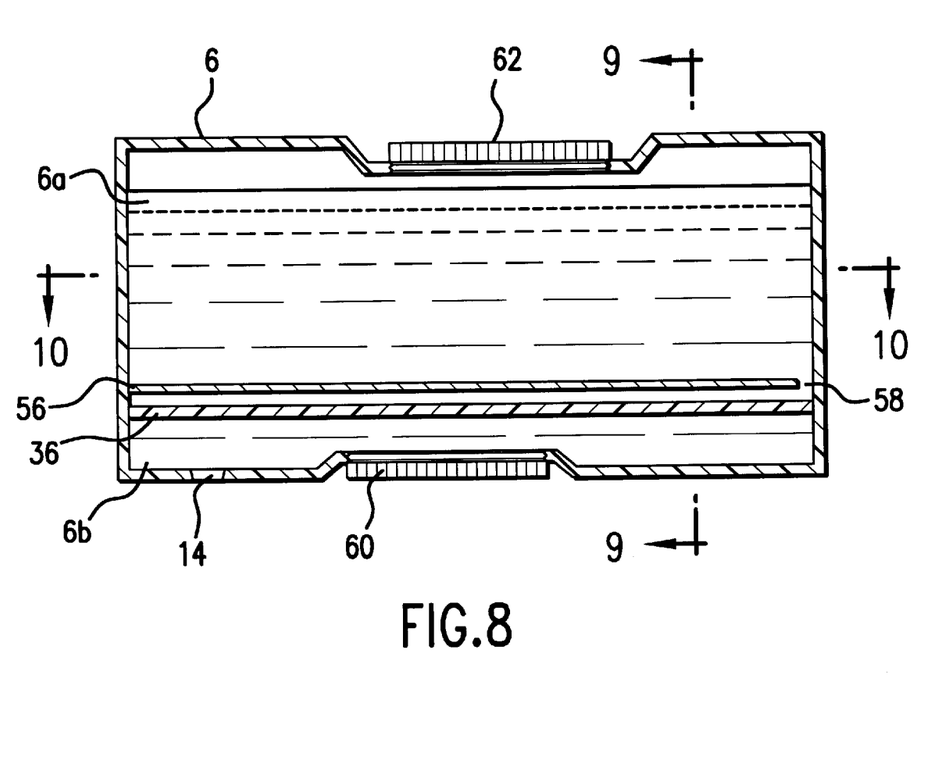
FIG. 8 is a sectional view of another embodiment of the reservoir of the present invention showing the reservoir divided into upper and lower portions.
Figure 9:
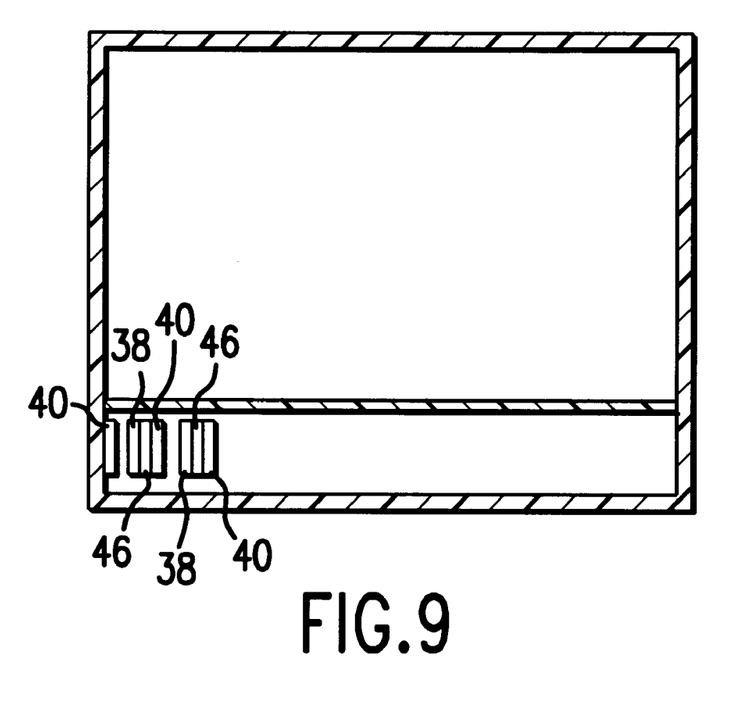
FIG. 9 is a sectional view taken along line 9—9 of FIG. 8.
Figure 10:
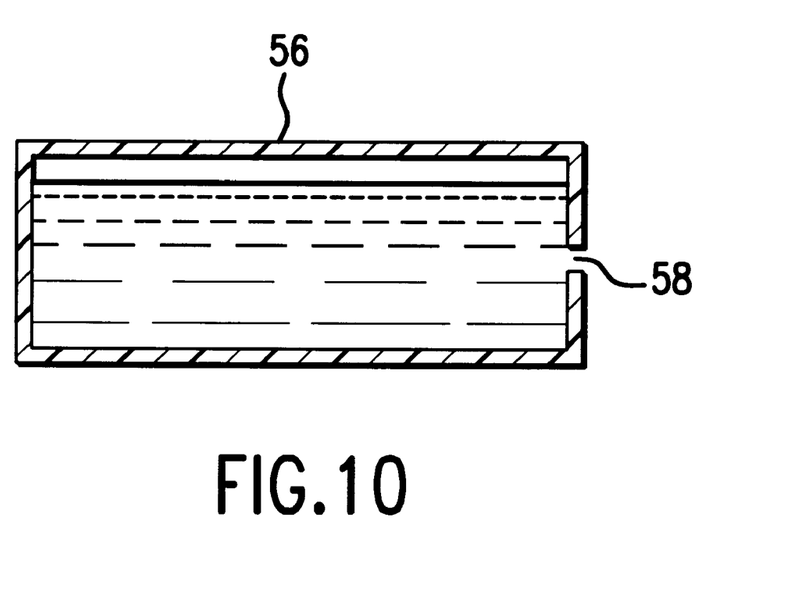
FIG. 10 is a sectional view taken along line 10—10 of FIG. 8.

A fourth embodiment of the reservoir 6 is shown in FIGS. 8–10. This embodiment differs from the third embodiment in that reservoir 6 has been divided into upper and lower portions 6a and 6b, respectively by a dividing member 56 such as a plate or the like. An orifice 58 in member 56 permits the tap water 13 to flow from the upper portion 6a to the lower portion 6b. The orifice should be sufficiently large so as to permit the water to flow at the humidifiers maximum rate of consumption of water. Orifice 58 and valve 14 are at opposite ends of lower reservoir 6b; for reasons which will become apparent the distance between the orifice 58 and valve 14 should be maximized.

In operation water 13 in the reservoir 6 is drawn from valve 14 into chamber 20. This causes water to flow from upper reservoir 6a through orifice 58 into lower reservoir 6b along the length of the electrodes 36 and through valve 14 into chamber 20. In this fashion the water passing through lower reservoir 6b receives the maximum benefit of the energized electrodes and avoids the untreated water in upper reservoir 6a from diluting the water in lower reservoir 6b thus maximizing the removal of calcium carbonate and other minerals from the water entering chamber 20.

As is the case with the third embodiment, the electrodes 36 are oriented so that the active surface of the cathode is vertical. Thus when polarity is reversed the clumps or particles of calcium carbonate or other minerals will fall to the bottom of lower reservoir 6b. To facilitate the removal of the dislodged calcium carbonate or other minerals a cap 60 is provided in the bottom of lower reservoir 6b. A handle and cap 62 is provided in the top of upper reservoir 6a for filling and carrying reservoir 6.

Figure 11:
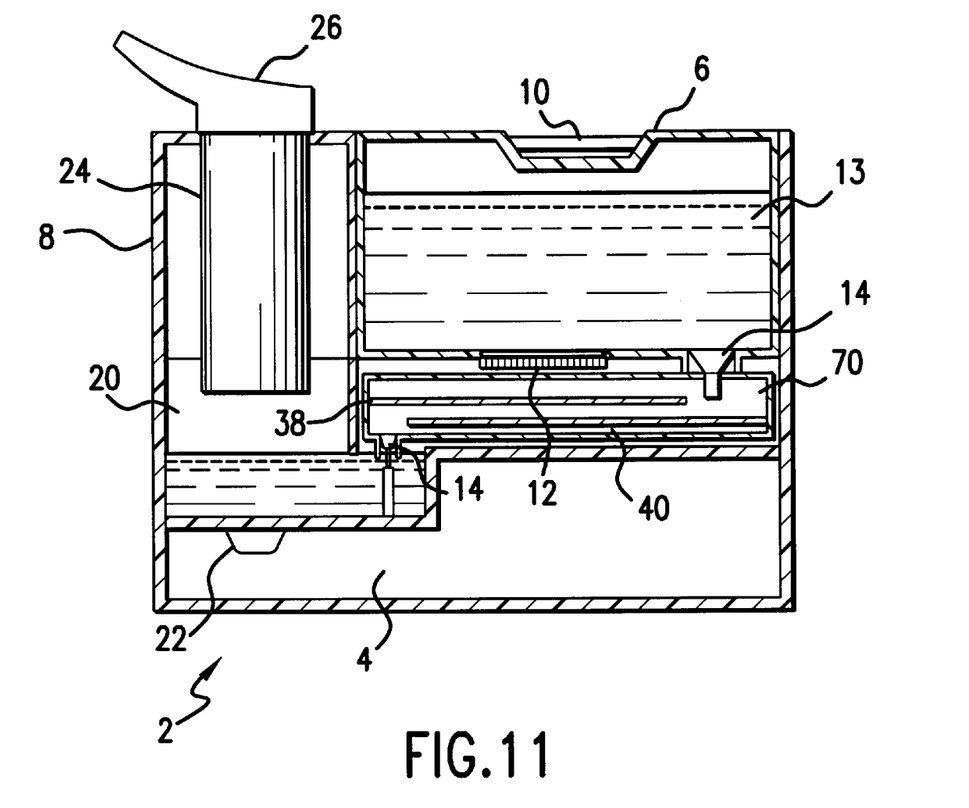
FIG. 11 is a sectional view of another embodiment of the present invention showing the electrodes located below the reservoir in a disposable cartridge.

A fifth embodiment of the invention is shown in FIG. 11. In this embodiment electrodes are not located in reservoir 6 but are located below it in a disposable cartridge 70. The electrodes, i.e. anode 38 and cathode 40 are shown horizontally connected to the interior of the cartridge. Water from reservoir 6 enters cartridge 70 through valve 14 in the bottom of reservoir 6, passes the anode 38 and cathode 40 and enters chamber 20. When the cathode 40 becomes coated with calcium carbonate to the extent that its efficiency is unacceptable the cartridge 70 should be replaced. As will readily be understood by those skilled in the art, cartridges may also be designed with replaceable electrodes. Polarity reversing means to clean the electrodes may be incorporated into the design of the removable cartridge.

It is possible to use the reservoir 6 itself as a cathode. This may be accomplished by constructing the reservoir 6 from stainless steel or by coating the interior surface of the reservoir 6 with an appropriate cathodic material. Connecting the electrodes 36 to the interior surface(s) of the reservoir 6 constitutes use of the reservoir as an electrode.

Figure 12:
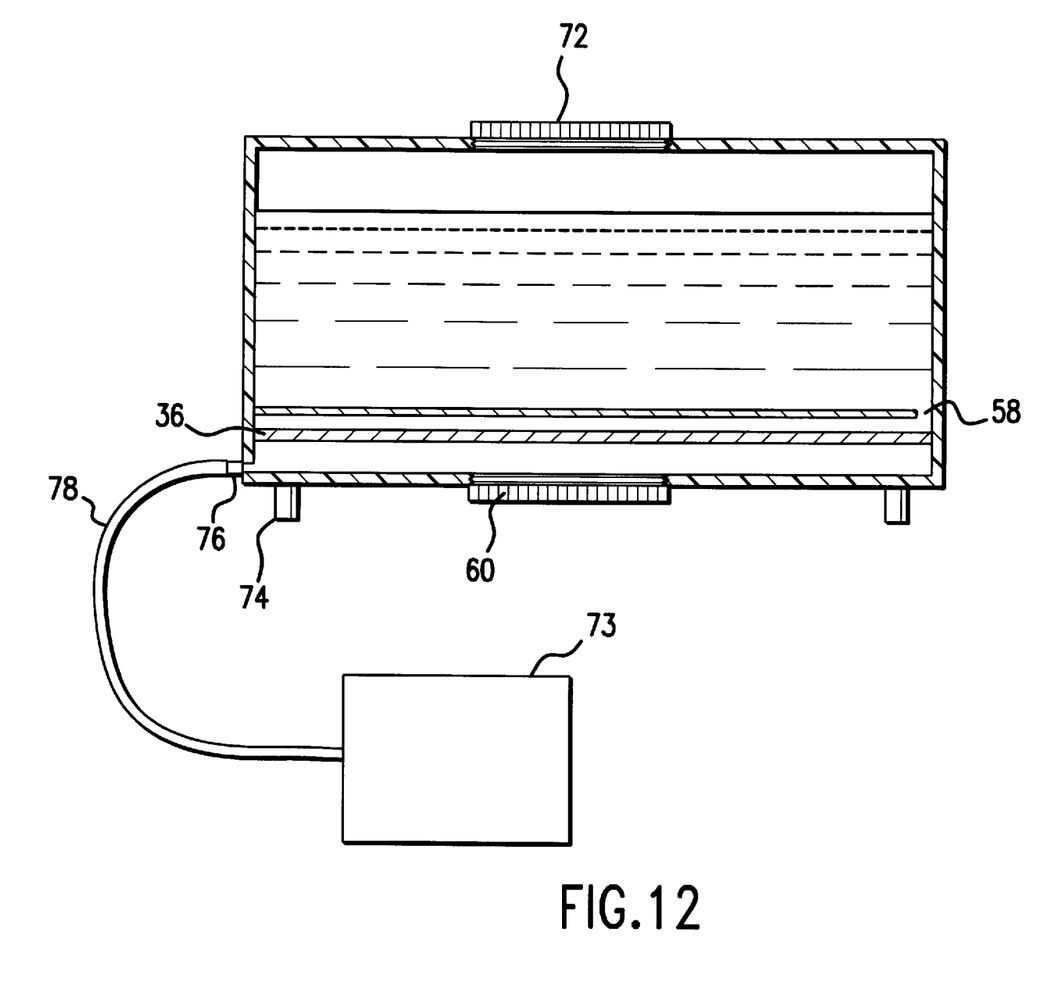
FIG. 12 is a sectional view of a detached demineralization reservoir.

The present invention is shown in FIG. 12 incorporated in a stand-alone reservoir 72. The stand-alone or detached reservoir may be used with humidifiers 73 which do not incorporate the present invention. Thus, this embodiment of the invention will enable it to be used in conjunction with almost any residential room humidifier. The embodiment shown in FIG. 12 is essentially the same as reservoir 62 shown in FIGS. 8 through 10 except for those features which enable it to function without being a part of a humidifier. The reservoir 72 of this embodiment has legs 74 connected to the bottom of the reservoir and an outlet 76 having a hose 78 connected to it. Reservoir 72 will have an appropriate electrical source connected to it (not shown) which will supply appropriate electrical power to electrodes 36. As in the embodiment shown in FIGS. 8 through 10, tap water in the upper reservoir will pass through orifice 58 and travel to the opposite end of the lower reservoir and exit through outlet 76.

In operation the exit end of tube 78 (not shown) may feed directly into the the room humidifer 73 it is being used in conjunction with (shown schematically in FIG. 12). The humidifier 73 may receive the treated water in its reservoir or, in the alternative, the humidifier's reservoir can be removed and tube 78 can be appropriately positioned into the same location of the humidifer which was fed by the humidifier's reservoir.

The present invention may be used to remove calcium carbonate from water used by any humidifier. Such dissolved minerals can cause scale which affects the humidifier performance as well as the ejection of undesirable particulate (the so-called white dust) into the air. Accordingly, the present invention can be used with any humidifier regardless of the type of water vaporization means which is used. For example, the invention may be applied to humidifiers which use heat, porous evaporation means such as a spongelike material mounted on a rotating drum, or any other vaporization means.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A room humidifier which provides moisture to the air having substantially reduced levels of calcium carbonate which comprises:

(a) a reservoir for containing water having an inlet and an outlet;

(b) a chamber having an inlet, adapted to communicate with said reservoir outlet so as to receive water therefrom;

(c) an ultrasonic transducer for atomizing the water in said chamber and operatively connected thereto;

(d) means for permitting the atomized water to pass from the humidifier to ambient air;

(e) means for removing dissolved calcium carbonate from substantially all the water placed in said reservoir, by depositing the calcium carbonate on a surface by electroplating means, said electroplating means including: a cathode positioned within and connected to said reservoir, said cathode being the surface upon which the calcium ion is deposited, and an anode positioned within and connected to said reservoir, and means for providing a direct current to said anode and cathode; and (f) dividing means for dividing said reservoir into an upper portion and a lower portion; said reservoir outlet, cathode and anode being located in the lower reservoir portion, and said dividing means being positioned above said cathode and anode; said dividing means having an orifice for permitting water to flow from said upper reservoir portion to said lower reservoir portion, the dividing means orifice located to ensure that the water flows from said dividing means orifice through said cathode and anode to said reservoir outlet.

2. The humidifier of claim 1 which further comprises means for temporarily reversing the polarity of said anode and said cathode thus causing said anode to become a cathode and said cathode to become an anode thus causing the precipitated calcium carbonate to become dislodged from said cathode, said reversal occurring after time period $T_1$ and continuing for a time period $T_2$ wherein $T_1$ is the amount of time said cathode and said anode have been energized since the termination of $T_2$.

3. The humidifier of claim 2 wherein said cathode has a substantially flat surface.

4. The humidifier of claim 3 wherein said anode has a substantially flat surface and said anode and said cathode are connected to opposite sides of said reservoir.

5. The humidifier of claim 3 wherein said cathode has a first part and a second part, said first and second parts being connected to opposite sides of said reservoir; and wherein said anode is positioned substantially at the mid point between said first and second cathode parts.

6. The humidifier of claim 4 wherein said cathode is made from graphite.

7. The humidifier of claim 5 wherein said cathode is made from graphite.

8. The humidifier of claim 3 wherein said anode and cathode are in the form of electrode strips, each strip including an anode and a cathode connected together and separated by an insulator, said strip being oriented so that their flat surfaces are substantially vertical when the humidifier is in use and are adjacent and parallel to the bottom of said reservoir.

9. The humidifier of claim 8 wherein $T_1$ is approximately 10 hours and $T_2$ is approximately 1 hour.

10. In a humidifier, having a reservoir for water, vaporization means for vaporizing said water and means permitting the vaporized water to pass from the humidifier, and means for removing dissolved calcium carbonate from substantially all the water placed in the reservoir, which comprises:

means for electroplating the calcium ion on a surface thus removing the calcium carbonate from solution, said electroplating means including an anode, a cathode and means for providing a direct current to said anode and said cathode, wherein said electroplating surface is the cathode; and dividing means for dividing said reservoir into an upper portion and a lower portion; said cathode and anode being located in the lower reservoir portion, and said dividing means being positioned above said cathode and anode; said dividing means having an orifice for permitting water to flow from said upper reservoir portion to said lower reservoir portion, the dividing means orifice located to ensure that the water flows from said dividing means orifice through said cathode and anode.

11. The electroplating means of claim 10 which includes means for temporarily reversing the polarity of said anode and said cathode thus causing said anode to become a cathode and said cathode to become an anode thus causing the precipitated calcium carbonate to become dislodged from said cathode, said reversal occurring after a time period $T_1$ and continuing for a time period $T_2$ wherein $T_1$ is the amount of time said cathode and said anode have been energized since the termination of $T_2$.

12. The electroplating means of claim 10 which is adapted to be positioned within said humidifier between said vaporization means and said reservoir.

13. The electroplating means of claim 10 which is adapted to be connected to and removed from the humidifier by the user thereof.

14. The electroplating means of claim 12 which is adapted to be connected to and removed from the humidifier by the user thereof.

15. The electroplating means of claim 11 wherein $T_1$ is approximately 10 hours and $T_2$ is approximately 1 hour.

16. A stand-alone apparatus for removing calcium ions from water for use in conjunction with a room humidifier which provides moisture to the air, which comprises:

(a) a reservoir for containing water having an inlet and an outlet, said inlet adapted to receive tap water and said outlet adapted to permit water to flow from said reservoir to the humidifier (b) means for removing dissolved calcium carbonate from substantially all the water placed in said reservoir, by depositing the calcium carbonate on a surface by electroplating means, said electroplating means including: a cathode positioned within and connected to said reservoir, said cathode being the surface upon which the calcium ion is deposited, and an anode positioned within and connected to said reservoir, and means for providing a direct current to said anode and cathode; and (c) dividing means for dividing said reservoir into an upper portion and a lower portion; said reservoir outlet, cathode and anode being located in the lower reservoir portion, and said dividing means being positioned above said cathode and anode; said dividing means having an orifice for permitting water to flow from said upper reservoir portion to said lower reservoir portion, the dividing means orifice located to ensure that the water flows from said dividing means orifice through said cathode and anode to said reservoir outlet.

17. The reservoir of claim 16 which further comprises means for temporarily reversing the polarity of said anode and said cathode thus causing said anode to become a cathode and said cathode to become an anode thus causing the precipitated calcium carbonate to become dislodged from said cathode, said reversal occurring after time period $T_1$ and continuing for a time period $T_2$ wherein $T_1$ is the amount of time said cathode and said anode have been energized since the termination of $T_2$.

18. The reservoir of claim 16 wherein said anode and cathode have substantially flat surfaces and are in the form of electrode strips, each strip including an anode and a cathode connected together and separated by an insulator, said strip being oriented so that their flat surfaces are substantially vertical when the humidifier is in use and are adjacent and parallel to the bottom of said reservoir; said reservoir outlet being located in the bottom of said reservoir.

19. In a humidifier, having a reservoir for water, an ultrasonic transducer for ultrasonically atomizing said water and means permitting the atomized water to pass from the humidifier, and means for removing dissolved calcium carbonate from substantially all the water placed in the reservoir, which comprises:

means for electroplating the calcium ion on a surface thus removing the calcium carbonate from solution, said electroplating means including an anode, a cathode and means for providing a direct current to said anode and said cathode, wherein said electroplating surface is the cathode and wherein said anode and cathode are in the form of electrode strips, each strip including an anode and a cathode connected together and separated by an insulator, said strip being oriented so that their flat surfaces are substantially vertical when the humidifier is in use and are adjacent and parallel to the bottom of said reservoir.

20. The reservoir of claim 18 wherein said reservoir includes dividing means for dividing said reservoir into an upper portion and a lower portion said dividing means having an orifice for permitting water to flow from said upper reservoir to said lower reservoir, said means being positioned so that it is above and adjacent to said electrode strips, and said orifice being substantially displaced from said reservoir outlet and said electrode strips being oriented so that water flows from said orifice between said strips to said reservoir outlet.

21. The electroplating means of claim 19 which includes means for temporarily reversing the polarity of said anode and said cathode thus causing said anode to become a cathode and said cathode to become an anode thus causing the precipitated calcium carbonate to become dislodged from said cathode, said reversal occurring after time period $T_1$ and continuing for a timer period $T_2$ wherein $T_1$ is the amount of time said cathode and said anode have been energized since the termination of $T_2$.

22. The electroplating means of claim 21 wherein $T_1$ is approximately 10 hours and $T_2$ is approximately 1 hour.

23. The electroplating means of claim 19 which is adapted to be positioned within said humidifier between said transducer and said reservoir.

24. The electroplating means of claim 19 which is adapted to be connected to and removed from the humidifier by the user thereof.

\* \* \* \* \*